Patented Feb. 3, 1953

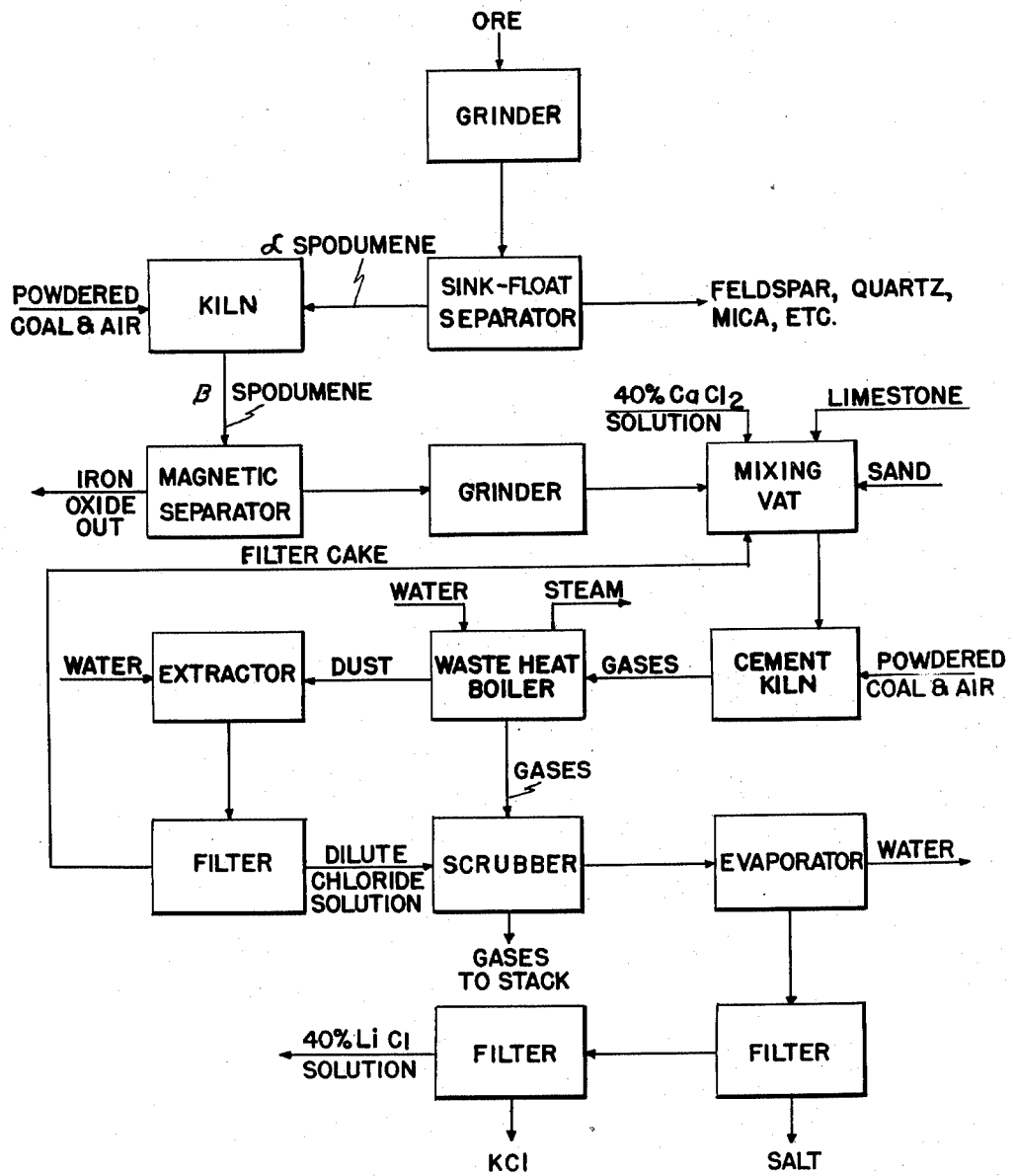

2,627,452

UNITED STATES PATENT OFFICE 2,627,452

PREPARATION OF LITHIUM CHLORIDE FROM SPODUMENE

George L. Cunningham, Cincinnati, Ohio, assignor to Scientific Design Company, Inc., New York, N. Y., a corporation of Delaware Application July 6, 1949, Serial No. 103,303

4 Claims. (Cl. 23—89)

The present invention relates to the treatment of lithium bearing ores for the recovery of lithium compounds therefrom and has particular reference to the method of recovering lithium from low grade lithium bearing ores, as a halide, the recovery being effected by a treatment of the ores incident to or simultaneously with a cement forming operation.

There are large amounts of lithium bearing ores which cannot be employed successfully on a commercial basis for the obtention of lithium compounds, due to the operational difficulties and expense of separation of these compounds from the ores. It has been proposed heretofore for example, to calcine lithium bearing ores in the presence of an excess of calcium chloride to effect conversion of the lithium components present to the halides, which then are separated from the calcined ores by water digestion. These processes result in a very low percentage recovery of lithium in terms of the theoretical yield. The presence of large amounts of calcium chloride is disadvantageous from the standpoint of process economy, as well as the deleterious effects of the presence of excess calcium chloride in the ore mass, in the calcining operation.

The calcium chloride separation process is regarded as not adaptable for use with harder shale type lithium bearing ores, in view of the difficulties of obtaining proper reaction between the constituents to effect a satisfactory release of the lithium components present.

It is an object of the present invention to provide a method for the separation of lithium values from readily available low grade lithium bearing ores, whereby a maximum recovery of lithium component is effected with marked overall cost economy in the process.

A further object of the invention is to provide a method for the treatment of hard, shale type ores containing valuable alkali metal components particularly lithium, whereby separation of the lithium component may be accomplished without expensive mechanical grinding operations.

A further object of the invention is to provide a method for the treatment of low grade ores containing lithium to effect recovery of the lithium component as a halide, with simultaneous conversion of the ore residue to a high grade cement product.

A further object is to prepare spodumene concentrates for the extraction of lithium therefrom, whereby undesirable contaminants are readily accessible for removal without expensive grinding operations.

A further object is to provide a method for the treatment of low grade lithium bearing ores including the pretreatment of the ores to concentrate lithium bearing components, reduction of the lithium bearing components of the ore to a finely divided state in the absence of grinding operations, and roasting of the finely divided ore particles in the presence of an alkaline earth halide to effect separation of the lithium components as halides, in the gaseous form, the ore residues comprising a white cement of high quality.

Other objects and advantages of the invention will be apparent from the following detailed description thereof, taken in connection with the attached flow diagram, it being understood that the specific examples of the invention described hereinafter are provided by way of example and not limitation.

In its broadest concept, the invention embodies the treatment of hard shale type ores containing alkali metal and particularly lithium components (1) to effect the separation of non-lithium bearing components to provide lithium bearing ore concentrates, (2) the treatment of the ore concentrates to reduce the ore to finely divided form in the absence of a major mechanical grinding step, (3) the roasting of the ore in the presence of an alkali earth metal halide to effect reaction of the halide with the lithium, and (4) the withdrawal of the lithium halide from the roasting zone with subsequent recovery and refinement, simultaneously with the conversion of the ore residues to a high grade white cement product.

Starting materials

The invention is particularly adaptable to the treatment of hard, low grade ores containing lithium present primarily as spodumene, to effect efficient recovery of the lithium component. Ores containing spodumene are found in all parts of the world, usually as pegmatite ores wherein the spodumene is fastened in a matrix of other ores. Thus, the preferred example of starting material consists of pegmatite ore. Pegmatite ore taken from King's Mountain, N. C. deposits is composed of the general formula:

32–36% feldspar
28–34% quartz
26–32% spodumene
4–6% mica
.03% casserite (tin ore)
.01–.03% beryl An average analysis of these materials (in weight percent) is comprised as follows:

|  | Spodumene | Feldspar | Quartz | Mica | Composite |
|---|---|---|---|---|---|
| $SiO_2$ | 61.29 | 65.2 | 98.5 | 61.9 | 84.00 |
| $Al_2O_3$ | 30.85 | 22.6 | .4 | 31.1 | 15.02 |
| $Fe_2O_3$ | .20 | .07 | .05 | .3 | .09 |
| $CaO$ | .38 | .42 |  | .2 | .26 |
| $MgO$ | .26 | .18 |  | .2 | .07 |
| $Li_2O$ | 6.84 | .32 |  | .4 | 1.92 |
| $Na_2O$ | .61 | 6.51 |  | .62 | 2.43 |
| $K_2O$ | .82 | 4.32 |  | 6.10 | 1.92 |

An ore of this type is somewhat harder than shale, rendering grinding to fine particle size an extremely difficult and expensive operation. For purposes of the present invention, however, the ore need be reduced only to the size necessary to accomplish a reasonably effective separation of the lithium bearing component of the ores or spodumene, for example a particle size of one inch more or less. While the process of the invention is adaptable to use with ores containing spodumene permitting of a reduction to fine particle size by grinding, it is particularly adaptable for use with the harder types of ores which heretofore have not been regarded as a commercially feasible source of lithium, due to the difficulties involved in mechanically and chemically freeing the lithium components.

Once the ore has been reduced to the desired particle size, the main lithium containing component of the ore, spodumene, preferably is concentrated, other non-lithium bearing components of the ore being rejected to waste or used for other purposes.

The concentration of spodumene may preferably be effected by a sink and float separation step, or froth flotation. The specific gravities of the materials in the pegmatite ore are as follows:

| | |
|---|---|
| Quartz | 2.65 to 2.66 |
| Beryl | 2.68 to 2.76 |
| Feldspar | 2.70 |
| Mica | 2.80 to 2.90 |
| Spodumene | 3.1 to 3.2 |
| Casserite | 6.8 to 7.0 |

It will be seen that if a separation mixture, such as ferrosilicon and water, is adjusted to give a floating density of about 2.90, the quartz, feldspar, beryl and mica will be floated off from the spodumene and casserite. The latter usually is present in very small amount, and for practical purposes may be treated with the spodumene or disregarded. This concentration of spodumene ore by the sink-float method triples the average lithium content of the ore, and markedly increases the lithium output per production operation, which is quite important from the standpoint of process economy.

Spodumene treatment

It is well known that spodumene occurs in nature in the so-called alpha crystalline modification, fastened in a matrix of other ores. As these ores are characteristically of a hardness greater than shale for example, it is exceedingly difficult to effect separation of the alpha spodumene by mechanical treatment of the ores. The power and equipment costs involved are prohibitive. Assuming cost not to be a factor, even with reduction of the spodumene ores to an 80 mesh particle size, only a partial recovery of lithium bearing components may be effected by calcining.

In accordance with the invention, after the sink and float separation is completed, the crude alpha spodumene concentrates are heated to a temperature between 900° C. to 1100° C. until the alpha spodumene is converted to the beta crystalline modification. This transformation is accompanied by a substantial increase in volume of the concentrate, which then consists of very finely divided particles of beta spodumene.

In operation, it is preferred to convert the alpha spodumene to the beta modification as a separate procedure preliminary to volatilization of the lithium components. The product of the conversion step may then be subjected to a light grinding operation to eliminate lumps and obtain a very fine powder which mixes and reacts readily with the later added constituents of the mix when passed through a reaction zone such as a rotary kiln, thereby substantially increasing the yield of lithium chloride and other chlorides.

The conversion from the alpha to the beta form may also be accomplished in the actual presence of the added constituents, which are first mixed thoroughly with the alpha spodumene particles and then passed through the conventional rotary kiln. The yields in this case are not as satisfatcory, due to the difficulty of obtaining the necessary intimate contact between the reaction materials.

The roasting mix comprises essentially beta spodumene, calcium carbonate, calcium chloride and sand, the calcium carbonate being present as well ground limestone. The calcium carbonate and sand components are added to modify the composition of the ore residue to provide a good grade of Portland cement. The calcium carbonate also assists in maintaining the reaction mixture in a porous state and in keeping the mass from adhering to the kiln walls.

At least one equivalent of calcium chloride must be present for each equivalent of total alkali metals in the reaction mixture. A ten percent excess of calcium chloride is preferred to insure complete reaction, without the accumulation of objectionable excesses of calcium chloride.

During the roasting operation, the following reactions pertinent to volatilization of the alkali metal constituents occur:

$$Li_2O + CaCl_2 = 2LiCl + CaO \text{ (in cement mix)}$$
$$Na_2O + CaCl_2 = 2NaCl + CaO \text{ (in cement mix)}$$
$$K_2O + CaCl_2 = 2KCl + CaO \text{ (in cement mix)}$$

Other reactions incident to the cement forming operation occur simultaneously, such as the decomposition of the limestone to calcium oxide and carbon dioxide, and the formation of calcium aluminate, silicates and alumino-silicates.

In carrying out the reaction, it is preferred to initially subject the beta spodumene, limestone, calcium chloride and other ingredients of the mix to a wet grinding operation to obtain a good reacting interface between the materials prior to roasting. With dry grinding, the ingredient contact is poor with erratic and low volatilization of alkali metal chlorides, particularly lithium chloride resulting.

As a specific example of the operation of the invention, a mixture of 100 parts beta spodumene, 64 parts sand, 590 parts limestone and 29.5 parts calcium chloride as 40% solution (10% excess calcium chloride) are passed through a rotary kiln at about 1100° C. to 1200° C. Higher temperatures tend to melt the mix, causing the mass to be less porous and thus less reactive. Lower temperatures can be used, but result in loss of lithium component due to incomplete reaction and volatilization. Approximately 19 parts of lithium chloride, 1.3 parts of sodium chloride, and 1.0 part of potassium chloride will be volatilized and are collected in a suitable collector device. These figures are based upon a theoretical 100% recovery, and actually about 90–95% recovery will be obtained in each run. The process also results in the production of about 500 parts of high grade cement having the following composition:

$SiO_2$ ---- 25.00%
$Al_2O_3$ ---- 6.22%
$Fe_2O_3$ ---- .044%
CaO ---- 66.60%
MgO ---- .03% (neglecting MgO in limestone)

This cement analysis falls within the standard of identity for cement compositions, obtaining a high grade cement having a low magnesium content.

In cases where a white cement is desired and it appears that the product will be discolored by the presence of iron in the spodumene, the beta spodumene modification is passed through a magnetic separator where iron oxide present is removed. The cement product resulting upon calcination is sufficiently white in color for industrial purposes and the product may be used advantageously where a low iron content white cement is a primary consideration. Due to the extremely small size of beta spodumene particles, iron oxide present may be removed with a minimum loss of spodumene sticking to the magnetic iron oxide, lending to overall increased recovery of lithium salts and obtaining a premium cement byproduct.

The low iron content beta spodumene is valuable in itself for use in the manufacture of ceramic and glass ware, particularly where water clear glass and white ware are desired.

Lithium chlorides

As the powdered beta spodumene, limestone and calcium chloride passes through the rotary kiln, the alkali metal components of the finely ground spodumene are volatilized as the chlorides, the major ingredient being lithium chloride. Sodium and potassium components of the ore are also volatilized as chlorides. The alkali metal chlorides pass off from the discharge end of the rotary kiln as a part of a gaseous mixture comprised essentially of carbon dioxide, carbon monoxide, nitrogen, unburned oxygen and cement dust. Small particles of sodium chloride, potassium chloride and lithium chloride may be condensed and held in suspension by the cement dust. Initially, the chloride particles are present in gaseous form in the hotter zones of the reaction chamber, but upon entering the cooler zones of the kiln and particularly at the discharge end, the chlorides cool down sufficiently to solidify, forming small particles. These particles suspended in the cement dust and the gaseous fumes may be separated by means of an electrical precipitator.

The hot gases and suspended materials emerging from the rotary kiln preferably are passed through a heat exchanger to recover as much heat as possible for other uses. In the heat exchanger, the dust present in the fumes drops out of the gaseous stream and precipitates a major fraction of the volatilized lithium and other chlorides present. It has been found that if this chloride bearing dust is added to a relatively large excess of water with agitation, a considerable portion of the soluble chlorides present in the dust may be leached out. If small amounts of water are used, the dust will set up as a cement and trap large amounts of chlorides. It is only necessary that a sufficient excess of water be employed to prevent this. The cleansed wet filter cake may be put back in the next charge in the cement kiln, whereby there is substantially no loss of the lithium, potassium and sodium chloride components present. Thus, ultimately the entire alkali metal chloride content of the dust is recovered as the chloride.

As an alternative procedure, the dust from the heat exchanger may be returned directly to the rotary kiln for reprocessing, eliminating the leaching step without ultimate loss of alkali metal chlorides.

The primary recovery of lithium chloride is effected by passing gases that pass through the heat exchanger through a spray tower for the further recovery of gaseous volatile salts present in the gas stream. In this operation, if the dust leaching operation has been employed, the mother liquor from the leaching operation may be used in the scrubber thereby increasing the concentration of chlorides in solution, and considerably reducing the amount of evaporation necessary in order to recover the alkali metal salts from solution.

The chloride solution from the dust leaching step and water scrubbing step is filtered and evaporated down until it contains about 40% lithium chloride. Initially, the solution is filtered hot to remove sodium chloride, and is then cooled down gradually to about room temperature where the potassium chloride is precipitated and filtered off. A 40% lithium chloride solution by weight, contained negligible amounts of potassium and sodium chloride is obtained.

The ore residues passing from the kiln are ready to be ground in a suitable mill to produce Portland cement which is suitable for commercial use.

Referring now to the flow diagram, the starting material containing spodumene is subjected to a rough grinding operation and passed to a heavy media separator, which may be of the conventional sink-float type or a cyclonic separator in which the roughly ground material suspended in a heavy media is passed through a cyclonic separator, obtaining a concentration of spodumene. The spodumene concentrate, which is the alpha modification at this point, is roasted to convert the spodumene to the beta modification. The beta spodumene is given a light grinding whereupon iron particles present may be removed by magnetic separation if desired. The beta spodumene is then ground to a fine particle form and passed to a mixing vat for admixture with 40% calcium chloride solution, limestone and sand, which mix is wet ground and passed to the rotary kiln for roasting.

The gases evolved in the roasting operation are passed through a heat exchanger and dust settling out from the gases in the heat exchanger is subjected to water extraction to remove alkali metal chlorides which have precipitated out with the dust. The sludge is filtered and the filter cake is returned to the mixing vat and reprocessed, to recover residual alkali metal chlorides.

Gases passing through the heat exchanger are passed through a water scrubber preferably of the cyclonic type. The dilute chloride solution obtained from the dust leaching step may be employed in the scrubber. The chloride solution is then evaporated down and potassium and sodium components separated by selective precipitation to obtain a 40% solution of lithium chloride.

Further small recoveries may be made by passing the scrubbed gases through a Cottrell precipitator, if desired, but this step is not worthwhile from the economic standpoint.

The advantages of the invention reside in the marked economies effected in the process, particularly through the use of readily available low grade spodumene bearing ores as the starting materials. Expensive grinding procedures are eliminated, the only mechanical grinding steps employed being optional and directed to the preparation of materials capable of reduction without heavy equipment. A markedly increased yield of lithium, approaching the theoretical recovery figure, is obtained with minimum loss of lithium to waste. A valuable white cement byproduct is obtained, which materially reduces the overall cost factor of the lithium recovery.

While the invention has been described in connection with the recovery of alkali metal chlorides, specifically lithium chloride, it will be appreciated that the method of the invention is equally operative employing any of the halogens.

I claim:

1. A process for the preparation of lithium chloride from spodumene comprising roasting spodumene to convert it to beta spodumene, mixing the beta spodumene with calcium carbonate and calcium chloride, roasting the mixture to react the spodumene with the calcium chloride and volatilize the lithium chloride from the reaction products whereby volatilized lithium chloride is discharged from the reactor with dust laden gases, separating the dust from the gases, washing the dust with a large amount of water to form a dilute solution, filtering the dust laden dilute solution whereby a filter cake of insoluble constituents of the dust and a dilute chloride solution is formed, returning the filter cake to the roasting of beta spodumene with calcium chloride operation, scrubbing the dust free gases with the chloride solution, evaporating the chloride soltuion to approximately 40% lithium chloride, filtering the hot solution from the evaporator to remove sodium chloride therefrom, cooling the filtered solution, and again filtering the solution to remove potassium chloride therefrom.

2. A process for the preparation of lithium chloride with a high grade Portland cement as a by-product comprising separating spodumene from the other constituents of a pegmatite ore containing spodumene by a heavy media separation, roasting the spodumene to convert it to beta spodumene, mixing the beta spodumene with calcium carbonate, sand and calcium chloride in excess of the stoichiometric amount required to react with the lithium in the spodumene, roasting the mixture at a temperature of about 1100 to 1200° C. to volatilize the lithium chloride and form a Portland cement clinker, dissolving the volatilized lithium chloride in water, and purifying the thus formed solution of lithium chloride by concentration of the solution and separation of less soluble constituents therefrom.

3. A process for the preparation of lithium chloride from spodumene comprising roasting spodumene to convert it to beta spodumene, mixing the beta spodumene with calcium carbonate and calcium chloride, roasting the mixture to react the spodumene with the calcium chloride and volatilize the lithium chloride from the reaction products whereby volatilized lithium chloride is discharged from the reactor with dust laden gases, separating the dust from the gases, washing the dust with a large amount of water to form a dilute solution, filtering the dust laden dilute solution whereby a filter cake of insoluble constituents of the dust and a dilute chloride solution is formed, scrubbing the dust free gases with the chloride solution, evaporating the chloride soltuion to approximately 40% lithium chloride, filtering the hot solution from the evaporator to remove sodium chloride therefrom, cooling the filtered soltuion, and again filtering the solution to remove potassium chloride therefrom.

4. A process for the preparation of lithium chloride with a high grade Portland cement as a by-product comprising separating spodumene from the other constituents of a pegmatite ore containing spodumene by a heavy media separation, roasting the spodumene to convert it to beta spodumene, grinding the beta spodumene to a fine powder, mixing the ground beta spodumene with calcium carbonate, sand and calcium chloride, roasting the mixture at a temperature of about 1100° to 1200° C. to volatilize the lithium chloride and form a Portland cement clinker, absorbing the volatilized lithium chloride in water to form a solution of lithium chloride and separating the thus dissolved lithium chloride from other salts in the solution.

GEORGE L. CUNNINGHAM.

REFERENCES CITED

The following references are of record in the file of this patent:

UNITED STATES PATENTS

| Number | Name | Date |
|---|---|---|
| 1,936,002 | Waggoner et al. | Nov. 21, 1933 |
| 2,413,644 | Nicholson | Dec. 31, 1946 |

OTHER REFERENCES

"Production of Lithium Chloride from Spodumene by a Lime-Gypsum Roast Process," by Sternberg, Hayes, and Williams. Dept. of Interior Article R. I. 3848, March 1946.

"Chloride Volatilization of Lithium from Spodumene," Fraas, F. and Ralson, O. C. Bureau of Mines Report of Investigations #3344, 11 pages, 1937.